(12) United States Patent
Tie Long et al.

(10) Patent No.: US 12,344,939 B2
(45) Date of Patent: Jul. 1, 2025

(54) SUS SURFACE TREATMENT METHOD

(71) Applicant: DONGGUAN DSP TECHNOLOGY CO., LTD., Dongguan (CN)

(72) Inventors: Guo Tie Long, Shenzhen (CN); Tan Yonggang, Shenzhen (CN)

(73) Assignee: DONGGUAN DSP TECHNOLOGY CO., LTD., Dongguan (CN)

( * ) Notice: Subject to any disclaimer, the term of this patent is extended or adjusted under 35 U.S.C. 154(b) by 369 days.

(21) Appl. No.: 18/146,033

(22) Filed: Dec. 23, 2022

(65) Prior Publication Data

US 2023/0203671 A1 Jun. 29, 2023

(30) Foreign Application Priority Data

Dec. 28, 2021 (JP) .................. 2021-215308

(51) Int. Cl.
*C23F 1/28* (2006.01)
*C22C 38/00* (2006.01)
*C22C 38/02* (2006.01)
*C22C 38/44* (2006.01)
*C22C 38/58* (2006.01)
*B29C 65/00* (2006.01)

(52) U.S. Cl.
CPC .............. *C23F 1/28* (2013.01); *C22C 38/002* (2013.01); *C22C 38/02* (2013.01); *C22C 38/44* (2013.01); *C22C 38/58* (2013.01); *B29C 66/74283* (2013.01)

(58) Field of Classification Search
CPC . C23F 1/28; C23F 1/32; C22C 38/002; C22C 38/02; C22C 38/44; C22C 38/58; B29C 66/74283; C23G 1/085; C23G 5/00; C25D 11/34; C25D 11/024; C23C 2222/20
USPC .......................................... 216/108
See application file for complete search history.

(56) References Cited

U.S. PATENT DOCUMENTS

2010/0189957 A1* 7/2010 Naritomi ............... B32B 15/092
   428/141
2018/0200933 A1* 7/2018 Cui ......................... B32B 15/18

FOREIGN PATENT DOCUMENTS

JP        2544974 B2 * 10/1996
JP    2010131888 A   * 6/2010

* cited by examiner

*Primary Examiner* — Duy Vu N Deo
(74) *Attorney, Agent, or Firm* — Greer, Burns & Crain, Ltd (57) ABSTRACT

A SUS surface treatment method for manufacturing a polymer-SUS joint structure having excellent bond strength is provided. A SUS surface treatment method for bonding with a polymer composite including a first etching step wherein the SUS surface is etched by acidic solution, a surface treatment step wherein the SUS surface is treated by ultrasonic wave, a second etching step wherein the SUS surface is etched again by acidic solution, a first silane coupling treatment step wherein the SUS surface is treated by anodic oxidation, a third etching step wherein the SUS surface is etched by acidic solution, and a second silane coupling treatment step wherein the SUS surface is treated by anodic oxidation.

7 Claims, 8 Drawing Sheets

FIG. 5 before the constant temperature and humidity test after the constant temperature and humidity test

SUS SURFACE TREATMENT METHOD

BACKGROUND

The present invention relates to a SUS(Stainless Used Steel) surface treatment method, and more particularly to a SUS surface treatment method for adhesively bonding a polymer-SUS joint structure, wherein the bonding between the SUS surface and the polymer is maximized through a first and second silane coupling treatment of the SUS surface.

The bonding between polymer and SUS is widely used in electronic components that need waterproofing and lithium-ion batteries of smartphones and electric vehicles, but it is mentioned that its reliability against the bonding strength between polymer and SUS is low. Therefore, surface treatment of SUS through etching treatment using acidic solutions is used to manufacture a polymer-SUS assembly to increase the activity and friction of the surface of SUS and to adhere strongly to the polymer. However, it was not possible to obtain sufficient adhesion and sealing between polymer and SUS only by SUS surface treatment through etching using acidic solution.

SUMMARY

Issues to Be Solved by the Invention

The present invention has been made to solve the issue, and an object thereof is to provide a SUS surface treatment method for manufacturing a polymer-SUS joint structure having excellent bond strength.

Means to Solve the Issues

A SUS surface treatment method for bonding with a polymer composite which comprises:
- (a) a first etching step wherein the SUS surface is etched by acidic solution;
- (b) a surface treatment step wherein the SUS surface is treated by ultrasonic wave;
- (c) a second etching step wherein the SUS surface is etched again by acidic solution;
- (d) a first silane coupling treatment step wherein the SUS surface is treated by anodic oxidation;
- (e) a third etching step wherein the SUS surface is etched by acidic solution;
- (f) a second silane coupling treatment step wherein the SUS surface is treated by anodic oxidation.

A SUS surface treatment method according to claim 1 comprising:
the step (d) is performed in 1~50 wt. % of the electrolyte solution which is either an acidic solution containing mixture of at least two or more in which sulfuric acid (1~50% concentration), phosphoric acid (1~50% concentration) and nitric acid (1~50% concentration) or an alkali solution containing mixture of at least two or more in which caustic soda (1~50% concentration), sodium carbonate (1~50% concentration) and adding ammonium nitride (1~50% concentration), for 10~300 seconds at a current density of 0.1~3 A/dm$^2$ using a rectifier for a positive duration (application time) of 500 ms pulse at 30~70° C. by adding 0.1~1 wt. % of a first silane coupling agent as an additive.

A SUS surface treatment method according to claim 1 comprising:
the step (e) is performed in an acidic solution containing general sulfuric acid, phosphoric acid and a trace amount of nitric acid at 30~70° C. for 10~300 seconds for removing 40~60% of the oxide film of the SUS surface.

A SUS surface treatment method according to claim 1 comprising:
the step (f) is performed in 1~50 wt. % of the electrolyte solution which is either an acidic solution containing mixture of at least two or more in which sulfuric acid (1~50% concentration), phosphoric acid (1~50% concentration) and nitric acid (1~50% concentration) or an alkali solution containing mixture of at least two or more in which caustic soda (1~50% concentration), sodium carbonate (1~50% concentration) and adding ammonium nitride (1~50% concentration), for 10~300 seconds at a current density of 0.1~10 A/dm$^2$ using a rectifier for a positive duration (application time) of 500 ms pulse at 10~70° C. by adding 0.1~1 wt. % of a first silane coupling agent as an additive.

A SUS surface treatment method according to claim 2 or 4 comprising:
the silane coupling agent is a mixture of at least two or more in which of $(RO)_3Si-(CH_2)_3-NH_2$, $(RO)_3Si-(CH_2)_2-Si(OC_2H_5)_3$, $(RO)_3Si-(CH_2)_3-SH$, $(RO)_3Si-CH=CH_2$, $(RO)_3Si-(CH_3)_3-OOC(CH_3)C=CH_2$, $(RO)_3Si-(CH_3)_3-O-CHCH_2O$ and $(RO)_3Si-(CH_2)_{15}CH_3$.

A SUS surface treatment method according to claim 5 comprising:
the second silane coupling agent are same kinds of mixture and different mixing ratios from the first silane coupling agent. A SUS surface treatment method according to claim 5 comprising:
the thickness of the oxide film formed on the SUS surface in the step (d) is 50~100 nm, and
the thickness of oxide film formed on the SUS surface in the step (f) is 100~150 nm.

Effects of the Invention

A SUS alloy surface is subjected to etching using an acidic solution to the SUS alloy surface, the SUS alloy surface is roughened, and the surface is roughened together with the microcrack by primary surface treatment with ultrasonic waves. Afterwards, large amount of fine cracks are formed on the surface through primary and secondary silane coupling treatment using ultrasonic waves, and the silane coupling agent is infiltrated into the generated crack to maximize the bonding force between the polymer and SUS.

BRIEF DESCRIPTION OF DRAWINGS

FIG. 1 shows photographs of the surface of SUS by the respective processes of surface treatment of stainless steel according to the present invention.

FIG. 2 shows an anodizing equipment for surface treatment of SUS according to the present invention.

FIG. 3 shows photographs of SUS specimens and tensile test methods for comparison tests between conventional products and the invention of the present application.

FIG. 8 shows (FIG. 8A) a constant temperature and (FIG. 8B) humidity test measuring machine and a test piece.

DETAILED DESCRIPTION

A manufacturing method of the polymer SUS junction is described by referring to the drawing.

A SUS surface treatment method for bonding with a polymer composite which comprises:
(a) a first etching step wherein the SUS surface is etched by acidic solution;
(b) a surface treatment step wherein the SUS surface is treated by ultrasonic wave;
(c) a second etching step wherein the SUS surface is etched again by acidic solution;
(d) a first silane coupling treatment step wherein the SUS surface is treated by anodic oxidation;
(e) a third etching step wherein the SUS surface is etched by acidic solution;
(f) a second silane coupling treatment step wherein the SUS surface is treated by anodic oxidation.

In the step (a), a first etching treatment is performed in an acidic solution containing general sulfuric acid, phosphoric acid and a trace amount of nitric acid at 30~60° C. for 10~180 seconds.

In the first etching step, etching marks are formed on the SUS surface and make the SUS surface rough.

In the step (b), a surface treatment using ultrasonic waves is performed in a general alkali solution by a frequency of 24~100 kHz at 30~60° C. and at an output of 400 W for 10~180 seconds.

A microcrack is formed on the etched SUS surface by the surface treatment using ultrasonic.

In the step (c), a second etching treatment is performed in an acidic solution containing general sulfuric acid, phosphoric acid and a trace amount of nitric acid at 30~60° C. for 10~180 seconds.

In the second etching step, further etching marks are formed on the SUS surface and make the SUS surface further rough.

In the step (d), a first silane coupling treatment is performed in 1~50 wt. % of the electrolyte solution which is either an acidic solution containing mixture of at least two or more in which sulfuric acid (1~50% concentration), phosphoric acid (1~50% concentration) and nitric acid (1~50% concentration) or an alkali solution containing mixture of at least two or more in which caustic soda (1~50% concentration), sodium carbonate (1~50% concentration) and adding ammonium nitride (1~50% concentration), for 10~300 seconds at a current density of 0.1~3 $A/dm^2$ using a rectifier for a positive duration (application time) of 500 ms pulse at 30~70° C. by adding 0.1~1 wt. % of a first silane coupling agent as an additive.

An oxide film having numerous bores (holes) is formed on the surface of the etched SUS, and a silane coupling agent is penetrated into the bore together with the formed porous bores.

Therefore, the bonding strength between SUS and polymer is increased, thereby improving bonding properties.

The thickness of the oxide film on the surface of the first silane coupling-treated SUS is 50~100 nm, and there are numerous bores (holes) on the surface.

In the step (d), the first silane coupling agent is a mixture of at least two or more in which of $(RO)_3Si—(CH_2)_3—NH_2$, $(RO)_3Si—(CH_2)_2—Si(OC_2H_5)_3$, $(RO)_3Si—(CH_2)_3—SH$, $(RO)_3Si—CH=CH_2$, $(RO)_3Si—(CH_3)_3—OOC(CH_3)C=CH_2$, $(RO)_3Si—(CH_3)_3—O—CHCH_2O$ and $(RO)_3Si—(CH_2)_{15}CH_3$.

In the step (e), the third etching treatment is performed in in an acidic solution containing general sulfuric acid, phosphoric acid and a trace amount of nitric acid at 30~70° C. for 10~300 seconds for removing 50~60% of the oxide film of the SUS surface.

The purpose of the second silane coupling treatment step is to remove some of the bores other than anodizing treatment in the remaining bores by removing about 60% of the surface oxide film of SUS containing silane coupling agent penetrated into the microcrack with etching.

In the step (f), a second silane coupling treatment is performed in 1~50 wt. % of the electrolyte solution which is either an acidic solution containing mixture of at least two or more in which sulfuric acid (1~50% concentration), phosphoric acid (1~50% concentration) and nitric acid (1~50% concentration) or an alkali solution containing mixture of at least two or more in which caustic soda (1~50% concentration), sodium carbonate (1~50% concentration) and adding ammonium nitride (1~50% concentration), for 10~300 seconds at a current density of 0.1~10 $A/dm^2$ using a rectifier for a positive duration (application time) of 500 ms pulse at 30~70° C. by adding 0.1~1 wt. % of a second silane coupling agent as an additive.

An oxide film having numerous bores (holes) is formed on the surface of the etched SUS, and a silane coupling agent is penetrated into the bore together with the formed porous bores. Therefore, the bonding strength between SUS and polymer is increased, thereby improving bonding properties.

The thickness of the oxide film on the surface of the SUS is 100~150 nm, and has numerous bores (holes) on the surface.

Through the first and second silane coupling treatment, a fine bore is formed again in the bore of the oxide film formed during the first silane coupling treatment on the surface of the SUS, and the shape of an oxide film shaped like the fur of the lizard's foot is formed to maximize the contact area and the bonding strength of the polymer and SUS.

In particular, the second silane coupling agent further penetrates the surface of SUS and has strong binding force when bonded with the polymer.

In the step (f), the second silane coupling agent is a mixture of at least two or more in which of $(RO)_3Si-(CH_2)_3-NH_2$, $(RO)_3Si-(CH_2)_2-Si(OC_2H_5)_3$, $(RO)_3Si-(CH_2)_3-SH$, $(RO)_3Si-CH=CH_2$, $(RO)_3Si-(CH_3)_3-OOC(CH_3)C=CH_2$, $(RO)_3Si-(CH_3)_3-O-CHCH_2O$ and $(RO)_3Si-(CH_2)_{15}CH_3$.

The second silane coupling agent in the step (g) are same kinds of mixture and different mixing ratios from the first silane coupling agent in the step (e).

By different mixing ratios of silane coupling agents, a binding force between the SUS surface and the polymer is stronger.

Through the first and second silane coupling treatment, the surface roughness increased on the surface of SUS, a lot of fine bores are formed, a silane coupling agent penetrated into the formed bore, and the silane coupling agent and the polymer are combined through a chemical reaction.

A photograph of the surface of the SUS alloy due to respective processes of the surface treatment of the SUS alloy are illustrated in FIG. 1.

Figure 1A:
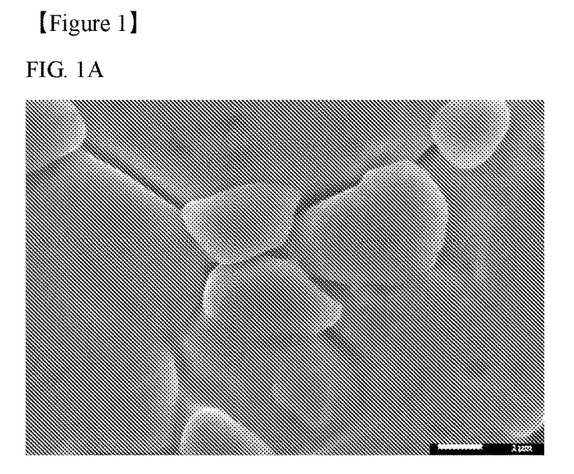
FIG. 1A is a photograph of the surface of SUS.

FIG. 1A is a photograph of the surface of a SUS.

Figure 1B:
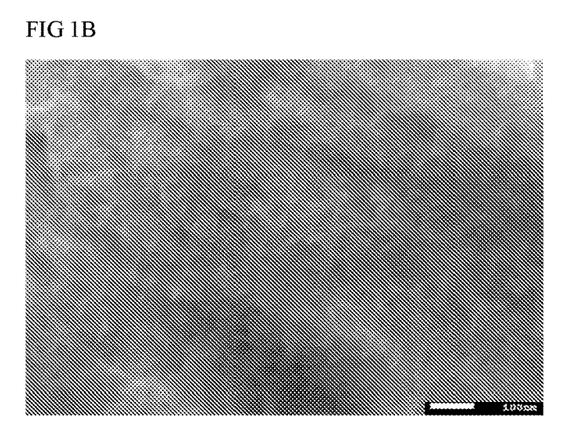
FIG. 1B is a photograph of the surface of SUS after the first silane coupling treatment stage of anodizing oxidation.

FIG. 1B is a photograph of the surface of SUS after the first silane coupling treatment step of anodizing oxidation.

Figure 1C:
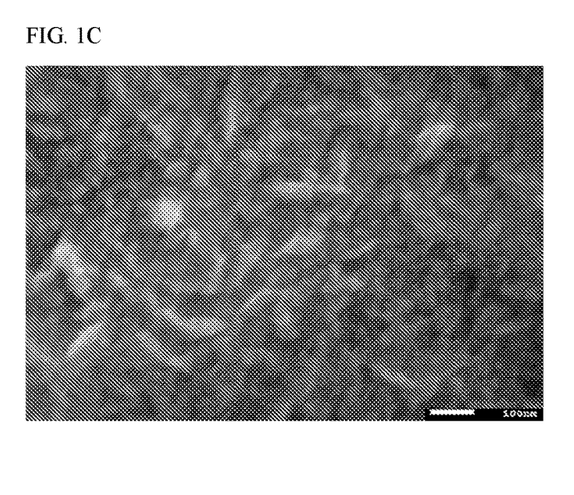
FIG. 1C is a photograph of the surface of SUS after the second silane coupling treatment stage of anodizing oxidation.
Figure 2A:
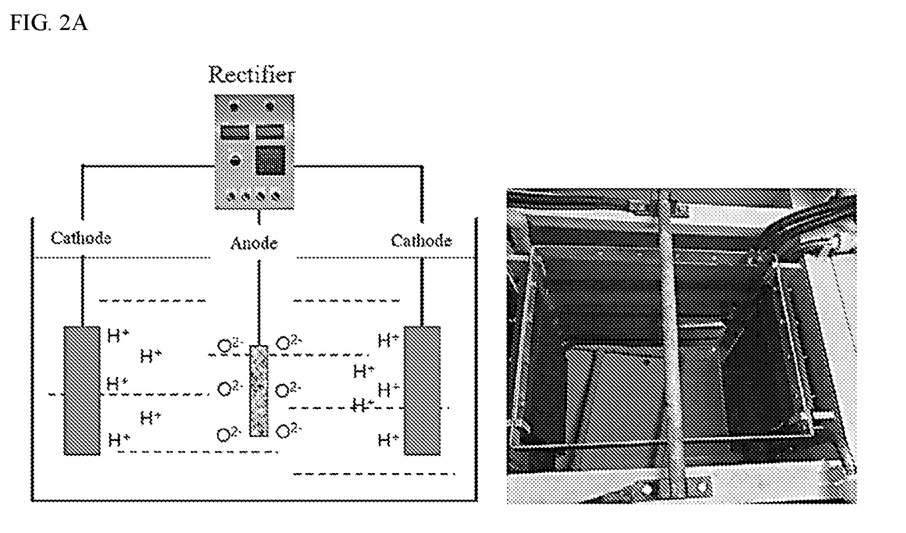
FIG. 2A is an oxidation anodizing apparatus.
Figure 2B:
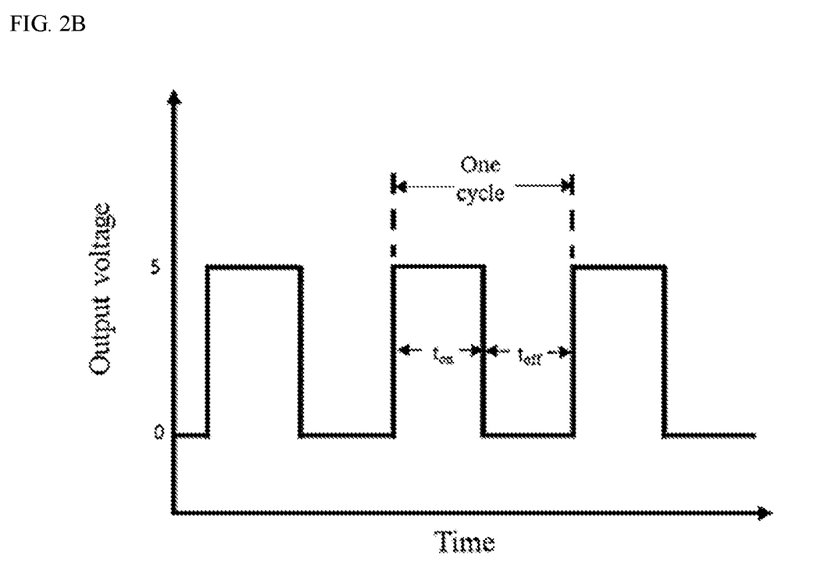
FIG. 2B is a pulse mode graph of anodizing apparatus.
Figure 3A:
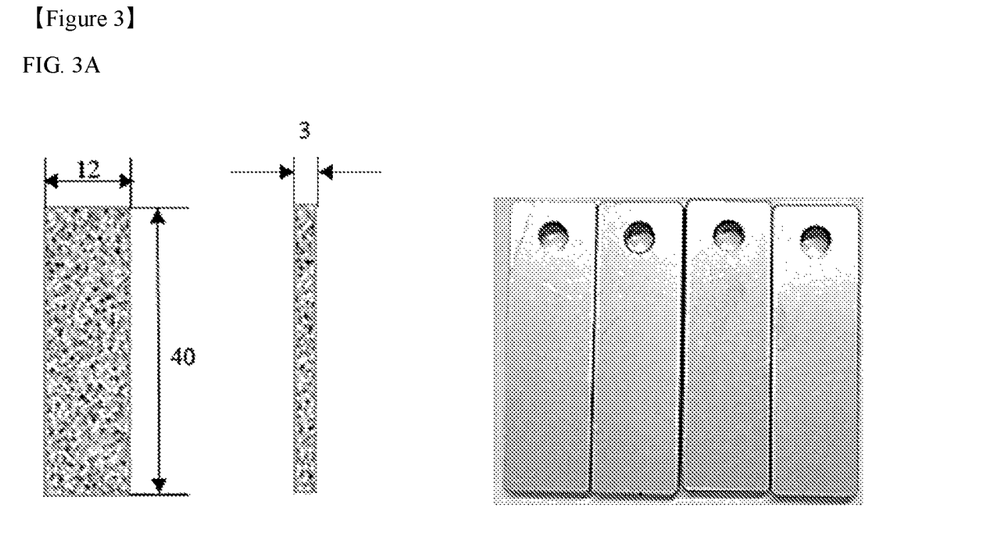
FIG. 3A is a SUS specimen of each of the conventional product and the invention of this application.
Figure 3B:
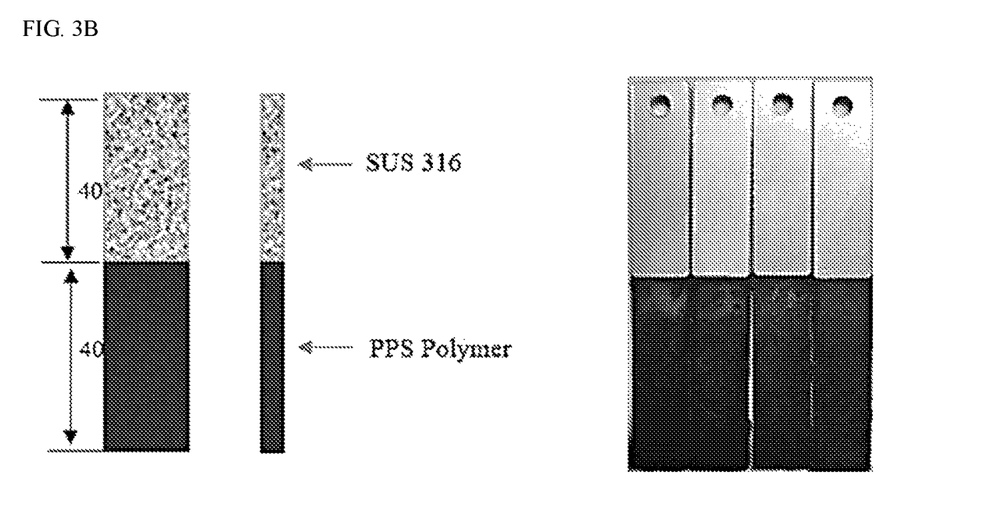
FIG. 3B is a SUS specimen bonded with polymer for each of the conventional product and the inventive product of this application.
Figure 3C:
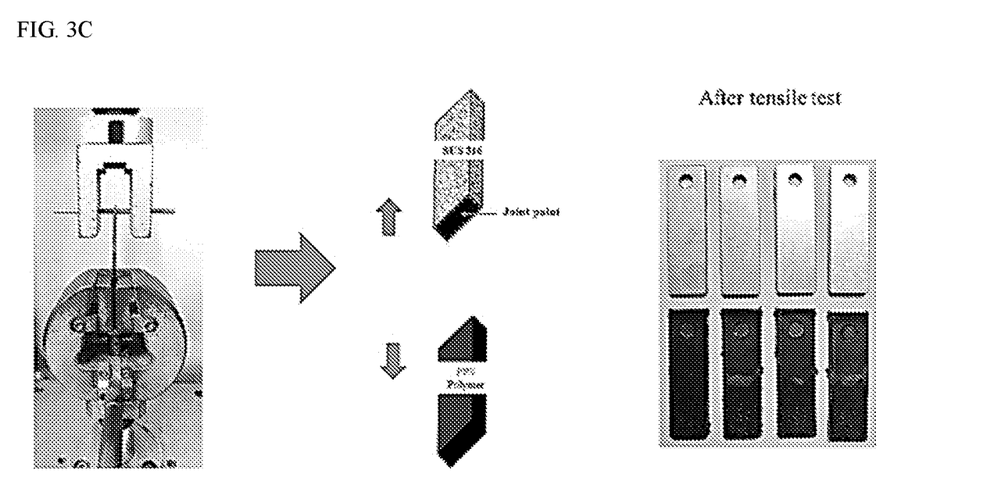
FIG. 3C shows a method of tensile test of conventional product and the inventive product after each constant temperature and humidity test.
Figure 4:
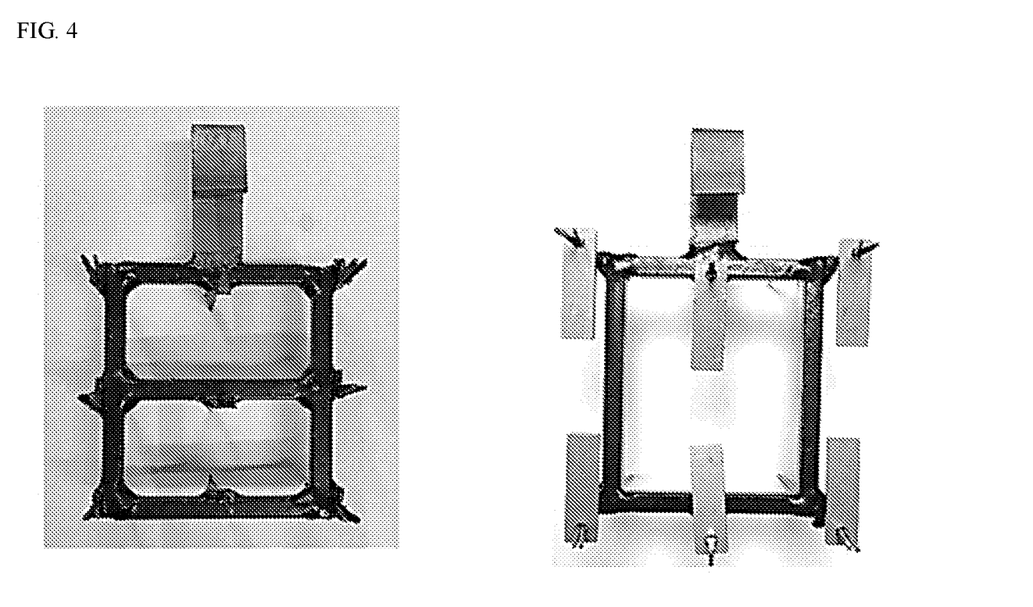
FIG. 4 shows tools for surface treatment of SUS specimens according to the present invention.

FIG. 1C is a photograph of the surface of SUS after the second silane coupling treatment step of anodizing oxidation.

Hereinafter, detailed embodiments and drawings will be described.

In order to prove the effect of the present invention, the experiment was carried out by making 10 test pieces for each experiment for a conventional example and an embodiment 1-2.

As the usable SUS metal, SUS alloy of SUS2XX, SUS3XX, SUS4XX and SUS6XX can be used.

The SUS alloy sample of SUS316 was used as the specimen used in the experiment.

The components of the SUS316 are shown in the table 1 below.

TABLE 1

| C | Mn | Si | P | S | Cr | Ni | Mo | Fe |
|---|---|---|---|---|---|---|---|---|
| ~0.08% | ~2.0% | ~1.0% | ~0.045% | ~0.030% | 16.0~18.0% | 10.0~14.0% | 2.0~3.0% | remnant |

Polymers usable in this invention are composite resins, polyethylene, polypropylene, polyvinyl chloride, polyvinyl acetate, polyacrylic acid ester, polymethacrylic acid ester, unsaturated polymer, polyamide, polyether, polyether, polystyrene, polystyrene, polystyrene, polystyrene, polyester, polystyrene, polystyrene, polystyrene, polystyrene, polystyrene, polystyrene, polystyrene, polystyrene, polystyrene·Her, Polyphenylene oxide, Polyphenylene sulfide, Polybutadiene, Polybutylene terephthalate, Polymethylpentene, Liquid crystal polymer, etc. can be used.

The polymer of the specimen used in the experiment was polypropylene sulfide (PPS) possessing 30% of glass fiber of Polyplastics Co., Ltd. in Table 2 below.

The physical properties table of the used PPS resin is shown in Table 2 below.

TABLE 2

| Material | Tensile strength (Mpa) | Melt temperature (° C.) | Heat distortion temperature (° C.) | Density (g/cm$^3$) | Elongation at rupture (%) |
|---|---|---|---|---|---|
| PPS | 170 | 310 | 140 | 1.57 | 2 |

Conventional Example

A test specimen is made by a conventional method. A conventional method is performed in the steps;

In the step (a), a first etching treatment is performed in an acidic solution containing general sulfuric acid, phosphoric acid and a trace amount of nitric acid at 40° C. for 90 seconds. In the step (b), a surface treatment using ultrasonic waves is performed in a general alkali solution by a frequency of 50 kHz at 40° C. and at an output of 400 W for 90 seconds. In the step (c), a second etching treatment is performed in an acidic solution containing general sulfuric acid, phosphoric acid and a trace amount of nitric acid at 40° C. for 90 seconds.

Embodiment 1

After step (a)-step (c), a test specimen is made by invention method as follows. In the step (d), a first silane coupling treatment is performed in 25 wt. % of the electrolyte solution which is caustic soda (5% concentration), sodium carbonate (5% concentration) and ammonium nitride (5% concentration) are mixed with a ratio of 3:1:1, for 150 seconds at a current density of 1.5 A/dm$^2$ using a rectifier for a positive duration (application time) of 500 ms pulse at 50° C. by adding 0.5 wt. % of a first silane coupling agent (a mixture of $(RO)_3Si-(CH_2)_2-Si(OC_2H_5)_3$ and $(RO)_3Si-(CH_2)_3-SH$ with a ratio of 1:3) as an additive.

Embodiment 2

After step (a)-step (d), a test specimen is made by invention method as follows. In the step (e), the third etching treatment is performed in in an acidic solution containing general sulfuric acid, phosphoric acid and a trace amount of nitric acid at 40° C. for 90 seconds for removing 55% of the oxide film of the SUS surface. And in the step (g), a second silane coupling treatment is performed in 25 wt. % of the electrolyte solution which is caustic soda (5% concentration), sodium carbonate (5% concentration) and ammonium nitride (5% concentration) are mixed with a ratio of 3:1:1, for 150 seconds at a current density of 5 A/dm$^2$ using a rectifier for a positive duration (application time) of 500 ms pulse at 50° C. by adding 0.5 wt. % of a second silane coupling agent (a mixture of $(RO)_3Si-(CH_2)_2-Si(OC_2H_5)_3$ and $(RO)_3Si-(CH_2)_3-SH$ with a ratio of 3:1) as an additive.

With the conventional example and the embodiment 1~2, the following resistance value measurement, tensile test, coupling force measurement and sealing experiment based on leaving time were performed, respectively. The results are as follows.

[Test 1]

Figure 5:
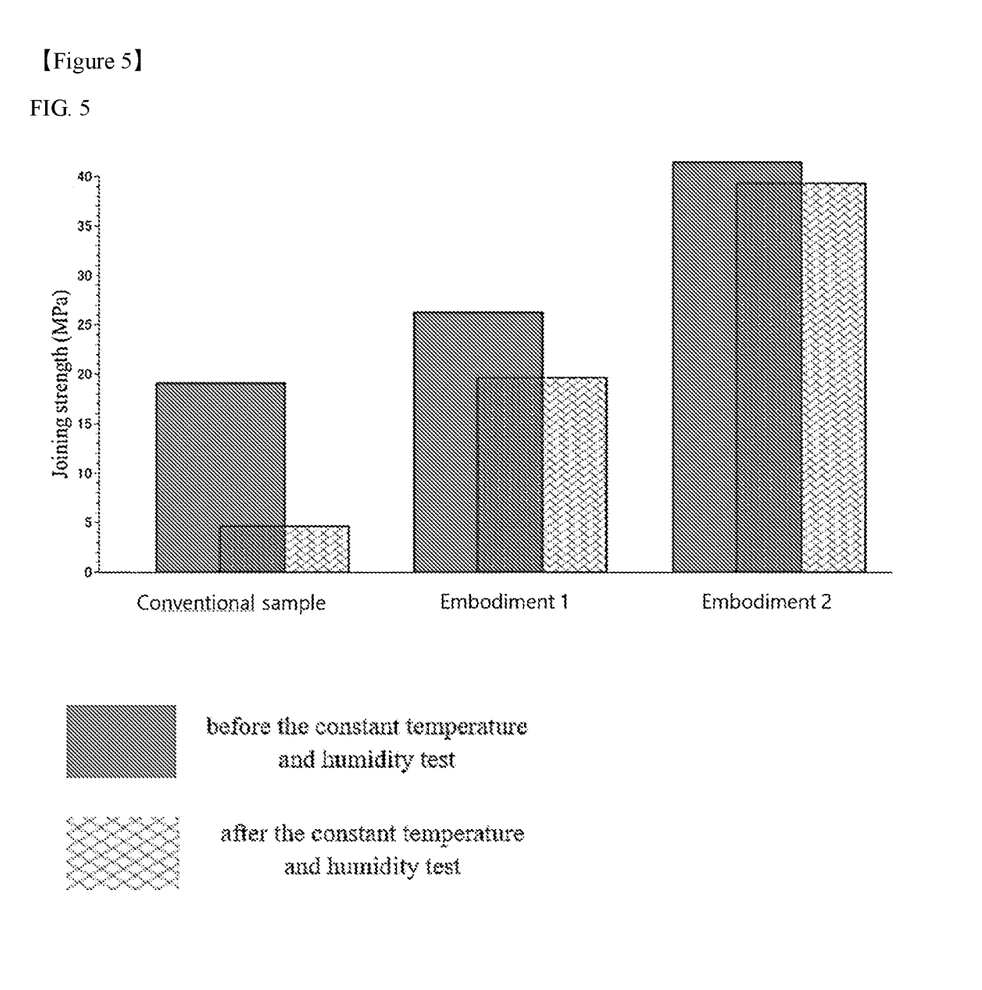
FIG. 5 shows the results of tensile test after constant temperature and humidity test of the conventional product and the invention of the present application respectively.

The specimen used in the conventional examples and Embodiments 1~2 is a SUS alloy of SUS316 as shown in FIG. 5A, with a width of 12 mm, a length of 40 mm, and a thickness of 3 mm, and is vertically combined as shown in FIG. 5B of the SUS specimen produced by the process of the conventional examples and Embodiments 1~2.

Figure 6:
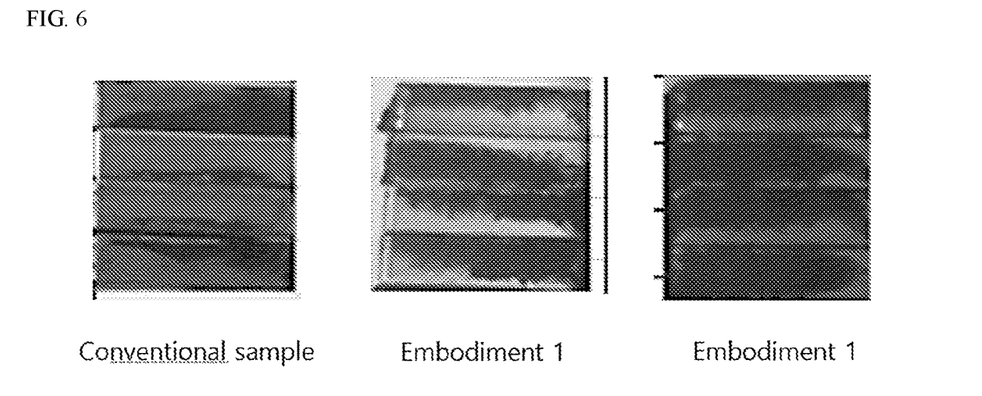
FIG. 6 shows photographs of the fracture surface by tensile experiment after each constant temperature and humidity test of the conventional product and the invention of the present application.

In order to measure the bonding strength, a tensile test is performed before/after 1000HR of constant temperature and humidity, as shown in FIG. 5C, and the results are shown in FIG. 6.

FIG. 5A is a test piece manufactured for a tensile experiment, and FIG. 5B is a polymer is superimposed on each SUS test piece in an embodiment.

FIG. 5C shows a photograph of the tensile experiment method.

As shown in the graph of FIG. 6, it may be seen that the specimen of embodiment 1 has better tensile force before/after the constant temperature and humidity test than the specimen of the conventional example.

Finally, it may be seen that the specimen of embodiment 2 has the best tensile force before/after the constant temperature and humidity test than the specimen of embodiment 2.

Figure 7:
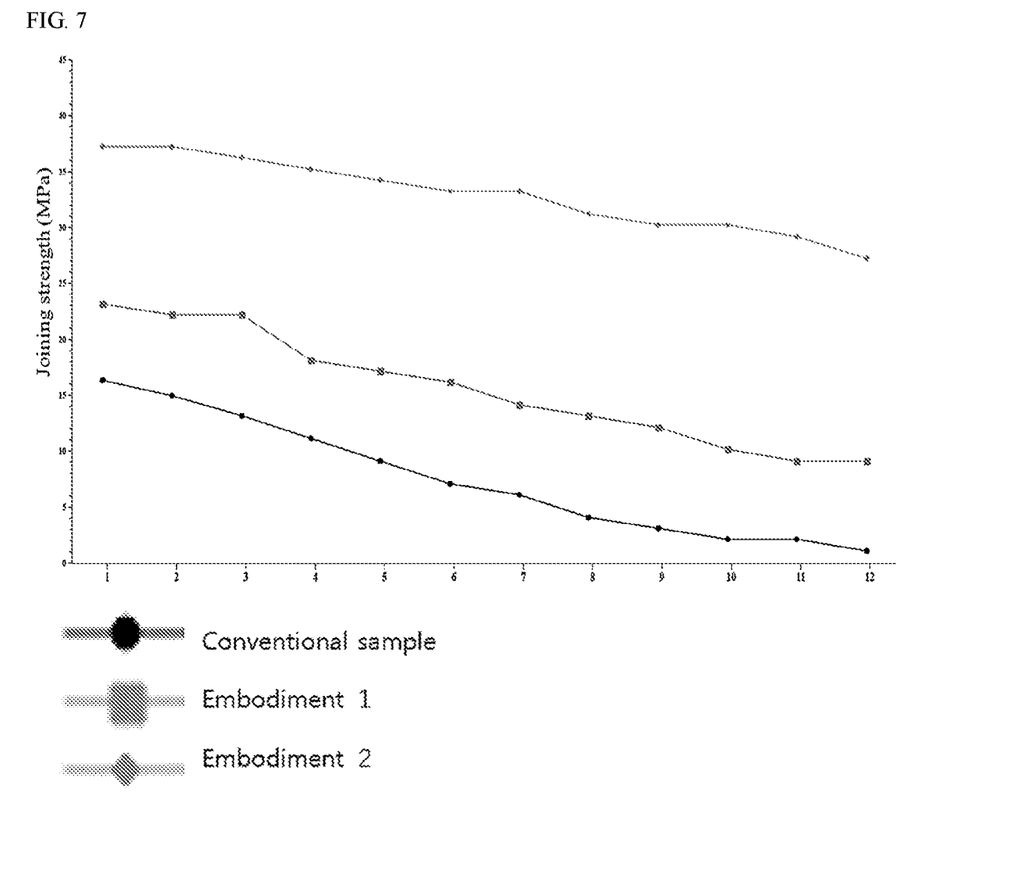
FIG. 7 shows a comparison graph of tensile experiments between conventional products and inventions of the present application by each neglect time.

FIG. 7 show a photograph of the amount of polymer remaining on the separated SUS surface of the test pieces according to the conventional example and the embodiments 1~2 after the tensile experiment is completed after the constant temperature and humidity test.

In case of the separation surface of the test piece of the conventional example, and it is easily separated, and it can be seen that the amount of polymer is about 30% on the SUS surface after separation.

In case of the separation surface photograph of the test piece of the embodiment 1, and it can be seen that the amount of polymer is about 50% on the SUS surface after separation.

In case of the separation surface photograph of the test piece in embodiment 2, and it can be seen that the amount of polymer is about 80% on the SUS surface after separation.

[Test 2]

Figure 8A:
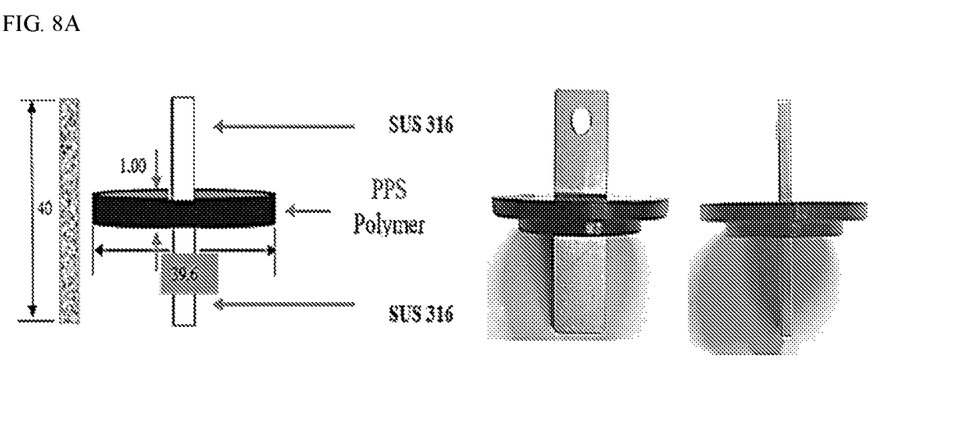
Figure 8B:
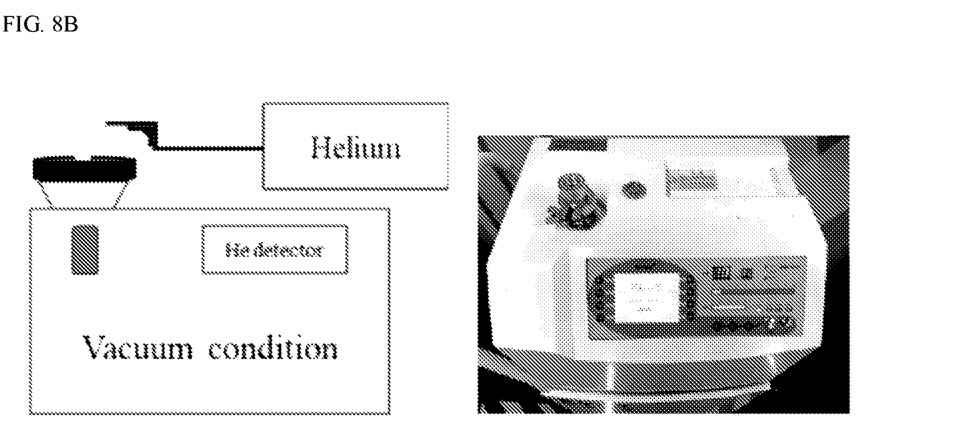

FIG. 8 show the results of the tensile strength test over time between 1 month and 12 months after polymer superposition for the test samples.

In such a manner, it can be seen that the test piece of the embodiment 1 is superior to the test piece of the conventional example in a decrease in tensile force due to the lapse of time.

Further, it can be seen that the tensile force of the embodiment 1 is decreased more due to the lapse of time than the conventional example.

Finally, it can be seen that the test piece of the embodiment 2 has the most decrease in tensile force due to the lapse of time than that of the embodiment 1.

[Test 3]

In order to measure a sealed state between the SUS alloy and the polymer using the specimens of the conventional Examples and Embodiments 1 to 2, a sealing experiment is performed after 1000HR at a constant temperature and humidity, and the result is shown in FIG. 10.

Figure 9:
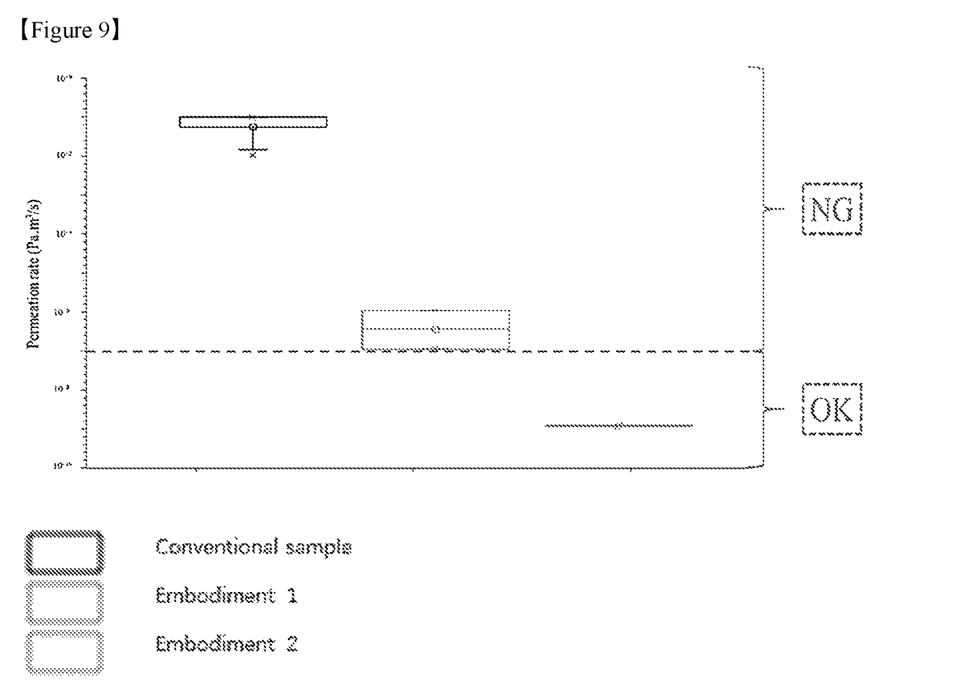
FIG. 9 shows comparison graphs of each of the conventional products and the inventions of the present invention as a result of a constant temperature and humidity test.

The specimen used in the conventional examples and Embodiments 1 to 2 is a SUS alloy of SUS316 as shown in FIG. 9(a), with a width of 12 mm, a length of 40 mm, and a thickness of 3 mm, and is injection-molded with a diameter of 39.6 mm and a thickness of 1 mm and bonded to the center of the SUS specimen manufactured by the processes of the conventional examples and Embodiments 1~2.

In order to measure the bonding strength, a sealing experiment was performed as shown in FIG. 9(b) after 1000HR of constant temperature and humidity, and the results are shown in FIG. 10.

As shown in the graph in FIG. 10, it can be seen that the sealing property of the embodiment 1 is superior to that of the specimen of the conventional example.

Finally, it can be seen that the test piece of the embodiment 2 is the most excellent in hermetic properties compared with the test piece of the embodiment 1.

FIG. 9A is a specimen photograph for constant temperature and humidity experiments.

FIG. 9B shows a photograph of the constant temperature and humidity experiment equipment.

INDUSTRIAL APPLICABILITY

The present invention is a method of fabricating a polymer-SUS joint structure, and it can promote weight reduction of parts and cost reduction by enhancing the bond strength and the sealing property between the polymer and SUS.

While a particular embodiment of the present SUS surface treatment method has been described herein, it will be appreciated by those skilled in the art that changes and modifications may be made thereto without departing from the invention in its broader aspects and as set forth in the following claims.

The invention claimed is:

1. A SUS surface treatment method for bonding with a polymer composite which comprises:
   (a) a first etching step wherein the SUS surface is etched by acidic solution;
   (b) a surface treatment step wherein the SUS surface is treated by ultrasonic wave;
   (c) a second etching step wherein the SUS surface is etched again by acidic solution;
   (d) a first silane coupling treatment step wherein the SUS surface is treated by anodic oxidation;
   (e) a third etching step wherein the SUS surface is etched by acidic solution; and
   (f) a second silane coupling treatment step wherein the SUS surface is treated by anodic oxidation.

2. The SUS surface treatment method according to claim 1, comprising:
   the step (d) is performed in 1~50 wt. % of the electrolyte solution which is either an acidic solution containing mixture of at least two or more in which sulfuric acid (1~50% concentration), phosphoric acid (1~50% concentration) and nitric acid (1~50% concentration) or an alkali solution containing mixture of at least two or more in which caustic soda (1~50% concentration), sodium carbonate (1~50% concentration) and adding ammonium nitride (1~50% concentration), for 10~300 seconds at a current density of 0.1~3 A/dm$^2$ using a rectifier for a positive duration (application time) of 500 ms pulse at 30~70° C. by adding 0.1~1 wt. % of a first silane coupling agent as an additive.

3. The SUS surface treatment method according to claim 1, comprising:
   the step (e) is performed in an acidic solution containing general sulfuric acid, phosphoric acid and a trace amount of nitric acid at 30~70° C. for 10~300 seconds for removing 50~60% of the oxide film of the SUS surface.

4. The SUS surface treatment method according to claim 1, comprising:

the step (f) is performed in 1~50 wt. % of the electrolyte solution which is either an acidic solution containing mixture of at least two or more in which sulfuric acid (1~50% concentration), phosphoric acid (1~50% concentration) and nitric acid (1~50% concentration) or an alkali solution containing mixture of at least two or more in which caustic soda (1~50% concentration), sodium carbonate (1~50% concentration) and adding ammonium nitride (1~50% concentration), for 10~300 seconds at a current density of 0.1~10 A/dm$^2$ using a rectifier for a positive duration (application time) of 500 ms pulse at 10~70° C. by adding 0.1~1 wt. % of a second silane coupling agent as an additive.

5. The SUS surface treatment method according to claim 2, comprising:

the silane coupling agent is a mixture of at least two or more in which of $(RO)_3Si-(CH_2)_3-NH_2$, $(RO)_3Si-(CH_2)_2-Si(OC_2H_5)_3$, $(RO)_3Si-(CH_2)_3-SH$, $(RO)_3Si-CH=CH_2$, $(RO)_3Si-(CH_3)_3-OOC(CH_3)C=CH_2$, $(RO)_3Si-(CH_3)_3-O-CHCH_2O$ and $(RO)_3Si-(CH_2)_{15}CH_3$.

6. The SUS surface treatment method according to claim 5, comprising:

the second silane coupling agent are same kinds of mixture and different mixing ratios from the first silane coupling agent.

7. The SUS surface treatment method according to claim 5, comprising:

the thickness of the oxide film formed on the SUS surface in the step (d) is 50~100 nm, and the thickness of oxide film formed on the SUS surface in the step (f) is 100~150 nm.

* * * * *